United States Patent
Fischer et al.

(10) Patent No.: US 10,999,293 B2
(45) Date of Patent: May 4, 2021

(54) EXAMINING A CONSISTENCY BETWEEN REFERENCE DATA OF A PRODUCTION OBJECT AND DATA OF A DIGITAL TWIN OF THE PRODUCTION OBJECT

(71) Applicant: Siemens Aktiengesellschaft, Munich (DE)

(72) Inventors: Kai Fischer, Baldham (DE); Markus Heintel, Munich (DE)

(73) Assignee: SIEMENS AKTIENGESELLSCHAFT

( * ) Notice: Subject to any disclaimer, the term of this patent is extended or adjusted under 35 U.S.C. 154(b) by 405 days.

(21) Appl. No.: 15/750,538

(22) PCT Filed: Jun. 27, 2016

(86) PCT No.: PCT/EP2016/064785
§ 371 (c)(1),
(2) Date: Feb. 6, 2018

(87) PCT Pub. No.: WO2017/045789
PCT Pub. Date: Mar. 23, 2017

(65) Prior Publication Data
US 2018/0227277 A1    Aug. 9, 2018

(30) Foreign Application Priority Data

Sep. 17, 2015  (DE) .......... 102015217855.2

(51) Int. Cl.
*H04L 29/06*        (2006.01)
*G06F 16/23*        (2019.01)
(Continued)

(52) U.S. Cl.
CPC ........ *H04L 63/123* (2013.01); *G06F 16/2365* (2019.01); *H04L 9/0819* (2013.01);
(Continued)

(58) Field of Classification Search
CPC . H04L 63/0435; H04L 9/0819; H04L 9/3278; H04L 63/123; H04L 63/18;
(Continued)

(56) References Cited

U.S. PATENT DOCUMENTS 5,592,561 A    1/1997 Moore
5,691,906 A    11/1997 Togashi et al.
(Continued)

FOREIGN PATENT DOCUMENTS

CN    1254106 A      5/2000
CN    101976067 A    2/2011
(Continued)

OTHER PUBLICATIONS

Goonetillake et al., Integrity constraint management for design object versions in a concurrent engineering design environment, Jul. 2001, International Database Engineering and Applications Symposium, pp. 255-261 (Year: 2001).*

(Continued)

*Primary Examiner* — Kenneth W Chang
(74) *Attorney, Agent, or Firm* — Schmeiser, Olsen & Watts LLP (57) ABSTRACT

A method to an associated computer program product, to a production unit, and to an arrangement for examining a consistency between reference data of a production object and data of a digital twin of the production object, wherein two separate communication channels are used.

14 Claims, 3 Drawing Sheets

(51) Int. Cl.
   *H04L 29/08* (2006.01)
   *H04W 12/10* (2021.01)
   *H04L 9/08* (2006.01)
   *H04L 9/32* (2006.01)
   *H04W 4/80* (2018.01)

(52) U.S. Cl.
   CPC ........ *H04L 9/3278* (2013.01); *H04L 63/0435* (2013.01); *H04L 63/18* (2013.01); *H04L 67/12* (2013.01); *H04W 12/1006* (2019.01); *H04W 4/80* (2018.02)

(58) Field of Classification Search
   CPC .... H04L 67/12; G06F 16/2365; H04W 12/10; H04W 4/80; H04W 12/1006
   See application file for complete search history.

(56) References Cited

U.S. PATENT DOCUMENTS

| | | |
|---|---|---|
| 6,190,224 B1 | 2/2001 | Byun et al. |
| 7,558,638 B2 | 7/2009 | Chang et al. |
| 2002/0156757 A1* | 10/2002 | Brown .................. G06Q 10/06 |
| 2003/0063772 A1* | 4/2003 | Smith .................. G07F 7/0833 |
| | | 382/100 |
| 2003/0158795 A1 | 8/2003 | Markham et al. |
| 2003/0219145 A1 | 11/2003 | Smith |
| 2005/0055646 A1* | 3/2005 | Melzer .................. G06F 9/451 |
| | | 715/804 |
| 2006/0282901 A1* | 12/2006 | Li ....................... H04L 63/0428 |
| | | 726/26 |
| 2007/0192850 A1* | 8/2007 | Cowburn ................ G07D 7/20 |
| | | 726/20 |
| 2011/0096955 A1* | 4/2011 | Voloshynovskiy ..... G07F 7/086 |
| | | 382/103 |
| 2012/0213366 A1 | 8/2012 | Brown et al. |
| 2013/0132730 A1* | 5/2013 | Falk ...................... H04L 9/3215 |
| | | 713/181 |
| 2014/0223583 A1* | 8/2014 | Wegner ................ G06F 3/1244 |
| | | 726/33 |
| 2016/0025787 A1 | 1/2016 | Muller et al. |
| 2018/0227277 A1 | 8/2018 | Fischer et al. |

FOREIGN PATENT DOCUMENTS

| | | |
|---|---|---|
| CN | 102436236 A | 5/2012 |
| CN | 103366198 A | 10/2013 |
| EP | 3295646 A1 | 3/2018 |
| WO | 2007056712 A2 | 5/2007 |
| WO | WO 2007056712 A2 | 5/2007 |

OTHER PUBLICATIONS

PCT International Search Report dated Sep. 29, 2016 and corresponding to PCT International Application No. PCT/EP2016/064785.

Non-English Chinese Office Action for Application No. 201680054046.9, dated Mar. 27, 2020.

* cited by examiner

EXAMINING A CONSISTENCY BETWEEN REFERENCE DATA OF A PRODUCTION OBJECT AND DATA OF A DIGITAL TWIN OF THE PRODUCTION OBJECT

CROSS-REFERENCE TO RELATED APPLICATIONS

This application claims priority to PCT Application No. PCT/EP2016/064785, having a filing date of Jun. 27, 2016, based off of German application No. DE 102015217855.2 having a filing date of Sep. 17, 2015, the entire contents of both of which are hereby incorporated by reference.

FIELD OF TECHNOLOGY

The following relates to a method, a corresponding computer program product, a production unit and an arrangement for examining a consistency between reference data of a production object and data of a digital twin of the production object, wherein two separate communication channels are used.

BACKGROUND

In modern automation systems, IT systems are used for the control of production processes or individual production steps. These IT systems control the production process based on a digital model of the production system or a digital model of a workpiece to be produced. The digital model is also referred to as a Digital Twin. The digital twin of the workpiece is synchronized with the condition of the workpiece during the production process. The use of IT systems in industrial automation requires customized measures to ensure IT security. IT systems with their underlying communication network are often more vulnerable to attack. In particular, the consistency between the physical world and a virtual representation in the form of the digital twin is crucial for a secure production process. Therefore, any manipulation of a workpiece or its digital twin are intended to be detectable.

It is generally known to attach a unique reference to a workpiece or a workpiece carrier, for example by a passive marker, such as a barcode or NFC chip. This reference can be scanned by a manufacturing plant and allows a unique assignment of the workpiece, or the assignment to its digital twin. It is also well known that a workpiece itself has IT capacities, and can actively send a reference to a manufacturing plant. With these methods, a reference of the workpiece is transmitted to a cutting machine unsecured. As soon as it is possible to scan, for example, an RFID chip, an unsecured transmission may be carried out, even by means of readers not provided for that purpose, which may have been manipulated, for example. In addition, a workpiece could transmit a manipulated reference value.

The provision of cryptographic procedures for protecting the reference value requires a sophisticated key management process, in which, in some cases, key material is issued and must be managed by every individual workpiece. In the case of a large number of workpieces within a production plant, this process is complex and time-consuming to manage.

SUMMARY

An aspect relates to providing a method, a computer program product (non-transitory computer readable storage medium having instructions, which when executed by a processor, perform actions) for said method, a production object and an arrangement, which in a simple manner increase the security in the processing of data from a digital twin of a production object.

Embodiments of the invention relate to a method for examining a consistency between reference data of a production object and data of a digital twin of the production object, wherein the reference data are transmitted over a first communication channel and the data of the digital twin over a second communication channel, and wherein an initial transmission over the first communication channel is linked to a physical availability of the production object within a manufacturing plant and a second transmission over the second communication channel is linked to an access to a communication network of the manufacturing plant.

A production object is understood to mean, for example, a workpiece or workpiece carrier, for example, a workpiece, which is processed in a production process. It may involve a manufacturing step within a refining process or an assembly of a plurality of workpieces to form a product.

The reference data of the production object contain at least information that enables the identification of the production object. For example, a numbering system of the production objects within a production system may be provided, which uniquely identifies every workpiece or every object for processing a workpiece. The reference data can contain a reference value, which is specifically designed for the purposes of identification.

Information stored on the digital twin of the production object, for example, includes the production plan, according to which the production process is to be carried out. For example, status information on the status of the production object can be stored on the workpiece in their current form. The digital twin reflects the currently existing physical arrangement in a manufacturing plant or a status of a manufacturing plant, for example a cyber-physical production system, or CPPS for short. This enables a synchronization and bi-directional interaction or reconciliation with the digital world in a PLM or engineering system. The digital twin contains, for example, information about the capacities or ambient conditions, production steps or tasks within the cyber-physical production system. For example, the contents of a memory are updated after each production step to reflect the status.

Two communication channels are provided, a first communication channel and a second communication channel. The first communication channel is linked to a physical availability of the production object within a production plant. For example, the first communication channel is only active or only usable if the production object is located in a certain spatial environment within the manufacturing plant. Thus, the first communication channel is based on a physical proximity of the real workpiece to a range of action of the communication partner. For example, this could be a production unit.

The second communication channel is linked to an access to a communication network of the manufacturing plant. For example, the second communication channel can only be used if a usage of, or entry or access to, an IT system of the production plant is possible. In particular, such a second communication channel via the communication network of the manufacturing plant is permanently activated and can be used for a manufacturing plant during a production process. For example, a production unit can exchange data with other production units of the production system on a permanent basis. In addition, the access to the communication network can also be linked to an authentication of the manufacturing plant, so that only authorized requests obtain access. The security is therefore based on securing the communication network, for example using cryptographic keys or certificates. The first communication channel, by contrast, can be used only in pre-defined time periods, for example, in which the workpiece or the production object is located, for example, close enough to or with an appropriate alignment in the vicinity of a production unit. Here, the security is also produced by the physical availability of the workpiece.

Advantageously, data that relate to the production object are therefore distributed over two independent paths in the plant. Because the workpiece itself can carry information, a production machine can directly read out data of the physical workpiece and also read out data of the digital twin of the workpiece via the second communication channel, for example from an IT communication network. The use of two independent communication channels increases the security of the data of the digital twin, since for a successful attack on a production step an attacker must successfully compromise or manipulate two independent communication channels at the same time. Both communication channels are advantageously provided in a digital automation system without the need for retrofitting. An IT communication infrastructure, such as Profibus (Process Field Bus) or Industrial Ethernet, can also be used for the purposes of transferring the data from the digital twin, in addition to the usual use. Advantageously, the physical transport of the production object automatically causes the production object to be located in a range of action of a production unit for specific times in accordance with the production schedule. A communication path which is based on physical proximity, such as optical communication methods or near-field communication methods, is provided for reading reference values.

The consistency check between the physical workpiece data and data that are stored in a digital twin of the workpiece ensures integrity and/or authenticity of one of the two datasets, provided that the other can be trusted. Thus, manipulations of data of the digital model in the digital twin or manipulations of the workpiece or workpiece carrier can be detected. If one of the two communication channels is protected, or the workpiece or the digital twin of the workpiece is protected, then the consistency check can provide information about the integrity of the respective other channel or dataset.

The purpose of the consistency check enables a response to be made in the event of an inconsistency. For example, a test result is output and a further step is then only carried out in the event of a confirmed consistency, for example, processing of the production object by the production unit. For example, a transmission of the data from the digital twin is only possible in cases in which a test result is available, which confirms the consistency between the reference data and the data of the digital twin, so that, in particular, the integrity of the data of the digital twin can thereby be concluded. The data from the digital twin is linked to a specific physical workpiece in an advantageous way.

In accordance with one configuration, the first communication channel is based on a physical proximity and is oriented in particular to an optical communication procedure or a near-field communication procedure. Therefore, a transmission of the reference data from a production object via the first communication channel only occurs, for example, if the physical distance between them is small enough. For example, a near-field communication method such as NFC, short for Near Field Communication, is applied, which enables a data transmission for short distances of a few centimeters. This means that the successful use of the first communication channel is only possible in a limited spatial range within the production plant. A data transmission of, in particular, manipulated reference data of another or a compromised production object that is not located in the specified geographic area within the manufacturing facility, in particular, in a radius around the production unit, is thus advantageously prevented from being transferred over the first communication channel.

In accordance with one configuration, the second communication channel is based on a communication infrastructure, in particular on a Profibus or Industrial Ethernet structure. Therefore, traditional industrial communication networks can be used, in particular those having a link to an office network.

In accordance with one configuration, in addition to a reference value, a first checksum over the data of the digital twin is also transmitted as reference data, and a second checksum is formed from the data of the digital twin transmitted over the second communication channel and the second checksum is compared with the first checksum and examined for consistency. In particular, a marker is used as a reference value, e.g. in the form of a serial number or a manufacturing plant-internal numbering. The first checksum for the data of the digital twin is, for example, a hash value. A hash function is applied to the data of the digital twin and only the checksum, from which due to the properties of one-way functions it is not possible to recover the data of the digital twin, is stored on the production object. For example, the reference value and the first checksum of the data of the digital twin are processed by a processor of a manufacturing plant. In one variant, the reference value is an integral part of the checksum, which means that a checksum is formed over a dataset from the data of the digital twin linked to or concatenated with the reference value.

On the basis of the reference, the data of the digital twin are requested over the second communication channel. For example, these are stored in a memory on a central control component. For example, on the basis of the data of the digital twin received over the second communication channel, e.g. over an Industrial Ethernet system, the processor forms a checksum. Thus, the hash value of the data of the digital twin is formed. This is then the second checksum. This is based on the security of the second communication channel or the integrity of the memory. A comparison of the two checksums is then performed. If these two values are largely the same, for example, after allowing for possible transmission errors, then a consistency exists between the reference data of the production object and the data of the digital twin of the production object. It can then be assumed with increased confidence that neither the production object itself nor the digital twin has been manipulated. Thus, the method enables an integrity protection of the data of the digital twin.

In accordance with one configuration, in addition to a reference value, a symmetric key or information on how to generate a symmetric key are additionally transmitted as reference data. The data of the digital twin are stored with the symmetric key in encrypted form and can be decrypted with the symmetric key. For example, by means of a processor of a production machine, the reference value and the key or the key information can be received over the first communication channel as soon as the workpiece is located in the range of action of the production machine. The data of the digital twin are transmitted from a memory over the second communication channel in encrypted form.

Only if the correct key material is present on the production machine can the data of the digital twin be decrypted.

An attacker who wants to manipulate the data of the digital twin would have to have knowledge of the symmetric key in order to have access to the data of the digital twin in unencrypted form within the communication network, and then to manipulate them as required. An exchange of encrypted data by an attacker and a transmission of the manipulated data can be detected, for example, using additional measures, such as advantageously by using authenticated encryption.

Moreover, using the proposed embodiment advantageously prevents the data from the digital twin from being read by the communication network. The data are not available in unencrypted form at any time. For example, the data are only available on the production unit in unencrypted form and only after the symmetric key has been successfully determined over the first communication channel. Advantageously, confidential data in the digital twin can only be read if a production unit or machine has physical access to the workpiece. The production unit itself can also only obtain access to and process the data of the twin in unencrypted form when it has physical access to the workpiece. In particular, in an advantageous way confidential process instructions can be encrypted within the data of the digital twin. Less critical data can exist in unencrypted form, in order to reduce the computational load. A key agreement or the distribution of the key material can be implemented during an initialization phase, for example, in a confidential environment.

In accordance with one configuration, in addition to a reference value, a symmetric key or information on how to generate a symmetric key are additionally transmitted as reference data. In addition to the data of the digital twin, a first message authentication code for the data of the digital twin transfer is also transmitted and a second message authentication code for the data transmitted over the second communication channel of the digital twin is formed by means of the symmetric key. The first message authentication code is compared with the second message authentication code and examined for consistency. In this scenario, although the data of the digital twin are also available in unencrypted form within the communication network, no decryption algorithm is needed, for example, on a processor of the production unit, and a simple message authentication code such as a Message Authentication Code, or MAC for short, can be formed instead. So-called keyed hash functions can also be used, which generate a checksum based on the symmetric key.

Advantageously, this enables protection of the integrity of the data of the digital twin using the MAC checksum or the keyed-hash checksum. This ensures that after an initial storage of the checksum, for example, on the memory that is accessed by the communication network, the data of the digital twin have not been changed or manipulated, or else changes to the data in the digital twin have only been made by authorized entities who know the associated key. Because a successful comparison must first take place between the first message authentication code and the second message authentication code prior to, for example, any further processing of the data of the digital twin is possible, this also ensures that the transmission over the first communication channel, which provides the key material, was able to be carried out successfully. Since the appropriate key or the appropriate key material must therefore be supplied via the actual workpiece and the first communication channel to be able to determine a second message authentication code that matches the first message authentication code, the authenticity of the production object is then proven. A successful consistency check can, in turn, be a prerequisite for further production steps or approvals or access permission in the production process.

The mechanisms for protecting confidentiality and ensuring the integrity or authenticity may be advantageously combined.

In accordance with one configuration, the information is configured as an input value and is suitable for generating the symmetric key using a key derivation function. Therefore, either a symmetric key is formed directly or an input for a key derivation is supplemented. For example, so-called key derivation functions are used for deriving the key.

In accordance with an extension, a production-object-specific key or production-object-specific information is provided by incorporating production-object-specific characteristics in a key derivation function, wherein the production-object-specific characteristics are generated in particular by means of the reference value or by a physically unclonable function. Thus, an individual key can be generated or transmitted for each production object or workpiece. Thus, the data of the digital twin can only be decrypted, or a MAC checksum for them can only be verified, if the matching production-object-specific key has been provided using the first communication channel. For example, an optical physically unclonable function, or PUF for short, can be used which captures the individual surface structure of a workpiece. Data of the digital twin are therefore advantageously only decryptable if the matching production object, which is uniquely characterized via the physically unclonable function, has successfully transmitted the reference data over the first communication channel.

In accordance with one configuration, in addition to a reference value an input value of a one-way function is also transmitted and the data of the digital twin are transmitted over the second communication channel as reference data, if a resulting value of the one-way function on the input value agrees with a stored resulting value. For example, it should be the case that a result E is obtainable by applying a hash function to an input value P. The input value P is appended to the reference data. Access to the data of the digital twin over the second communication channel should only be possible if a hash value formed on the matching result E by applying the hash function to the correct input value P can be proven. This proof is advantageously provided prior to transmitting the data of the digital twin, so that the knowledge of the input value is used as an authorization feature. Alternatively, an examination can be carried out retrospectively and, for example, trigger an alarm message. To this end, a stored correct result is available at a suitable location. In particular, the correct result E is an integral part of the data of the digital twin. The consistency between the reference data including the input value P and the data of the digital twin including the result E is examined. In turn, an access to the data of the digital twin by a production unit is only possible if the physical proximity to the production object also applies, because knowledge about the input value P must be obtained. In addition, depending on the configuration of the input value, a manipulation of the data on the workpiece or production object, or of the production object itself, can be detectable, since in that case the correct input value will normally not be available. In cases where the correct input value is present despite manipulation of the data or the workpiece, a comparison of the data with the reference data can be made in addition, to be able to detect any discrepancy and hence manipulation.

Depending on the configuration, the consistency check can include a direct comparison of two datasets, in particular two checksums or a plausibility check of a reference value, which is obtained from decrypted reference data, or a correspondence test of two keys used or a query of a secret.

Embodiments of the invention further relate to a computer program product with a computer program, having means for carrying out the method described above, if the computer program is executed on a program-controlled device.

A computer program product, such as a computer program means, can be provided or supplied as a storage medium, such as a memory card, USB stick, CD-ROM, DVD, or else in the form of a downloadable file from a server to a network. This may be effected, for example, in a wireless communication network by the transmission of a corresponding file with the computer program product or the computer program means. A suitable program-controlled device is in particular a control device, such as a microprocessor.

Embodiments of the invention further relate to a production unit having a first interface to a production object, wherein reference data of the production object can be received over the first interface, wherein an initial transfer of the reference data is linked to a physical proximity between the production unit and the production object, and to a second interface to a communication network of a manufacturing plant, wherein data from a digital twin of the production object are received over the second interface, wherein a second transmission of the data from the digital twin is linked to an access to the communication network, and also relates to an examination unit for examining a consistency between reference data of the production object and the data of the digital twin of the production object.

Embodiments of the invention also relate to an arrangement consisting of a production object, production unit, memory unit and processor, having a first communication channel between production object and production unit based on a physical proximity between production unit and production object for the transmission of reference data of the production object and having a second communication channel of a communication network between production unit and memory unit for the transmission of data from a digital twin of the production object, wherein the processor is suitable for examining a consistency between the reference data and the data of the digital twin.

In accordance with one configuration, the processor is integrated into the production unit or provided by a cloud service or is integrated into a control unit of a production plant, in particular, together with the storage unit.

BRIEF DESCRIPTION

Some of the embodiments will be described in detail, with reference to the following figures, wherein like designations denote like members, wherein.

In the figures, functionally equivalent elements are provided with the same reference numerals, unless otherwise indicated.

DETAILED DESCRIPTION

Figure 1:
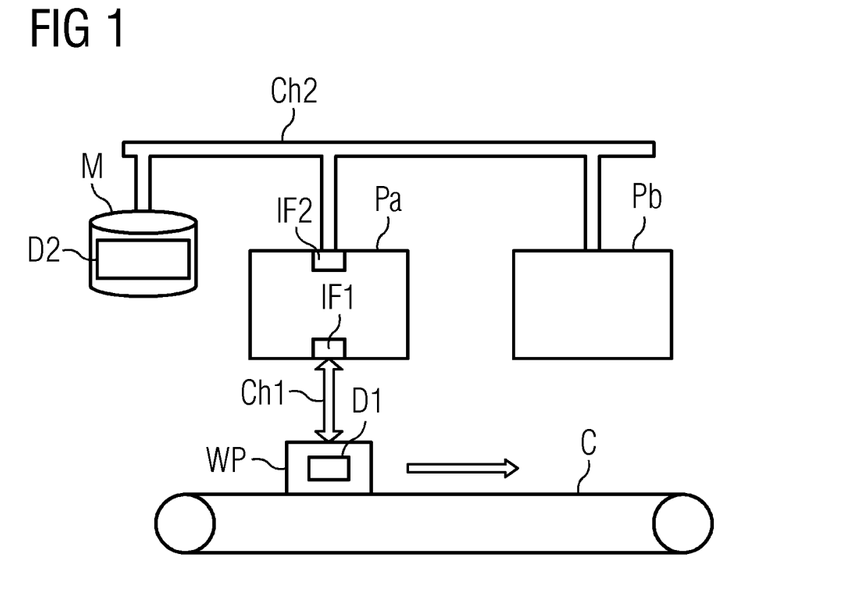
FIG. 1 a schematic representation of a workpiece when passing through a section of a production line.

FIG. 1 shows schematically the passage of a workpiece through a plurality of production steps in an automated production plant. For example, this involves a production line in which a workpiece WP passes through one or more production steps per production unit Pa, Pb. For example, this can involve the assembly of a plurality of components, or a refinement of the workpiece, or a coating process, or a transfer to a workpiece carrier. The workpiece WP is transported, for example, by means of a conveyor belt C into the range of action of various production units Pa, Pb. For example, a first production unit Pa processes the surface of the workpiece WP. It may consist of a grinding machine, for example. The subsequent production unit Pb may be, for example, a machine for applying a coating or for attaching fittings, such as screws or the like. The workpiece WP has a memory which can store a reference dataset D1. This can be, for example, a barcode or NFC chip. For example, a passive marker is provided, in which case power is supplied externally via an antenna. As soon as this chip enters the vicinity of a reader of the first production unit Pa, the first communication channel Ch1 between workpiece WP and production unit Pa can be used. Over this first communication channel Ch1, which is therefore based on the proximity of the workpiece WP to a first interface IF1, a reference value is transmitted, which identifies the workpiece WP. The reference value is part of the reference dataset D1.

Via a second interface IF2, the production unit Pa can use the second communication channel. In particular, an IT communication network is used, over which data of the digital twin D2 of the workpiece WP are transmitted to the production unit Pa. The IT communication network can also be provided for data traffic of the different production units Pa, Pb of a manufacturing plant among one another and of production units with control units. In particular, the production unit Pa accesses data from a memory M of a control computer via the second communication channel Ch2. The consistency examination takes place, in particular, on a processor provided on the production unit or on a separate unit, which at the same time enables the production unit to access data over the second communication channel Ch2 only in accordance with the result of the consistency examination.

Figure 2:
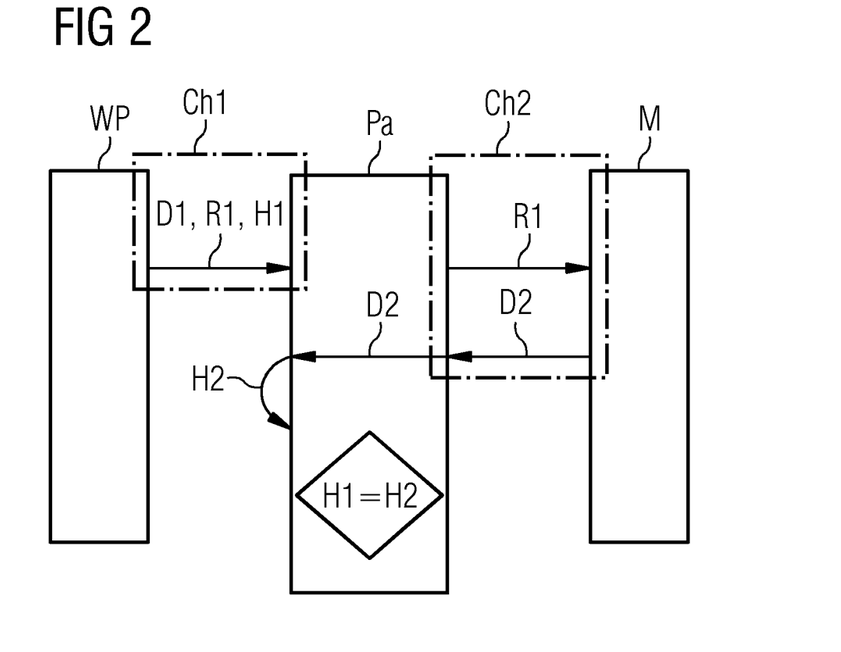
FIG. 2 a schematic representation of the communication steps according to a first variant of the exemplary embodiment.

FIG. 2 shows a schematic representation in relation to a first variant of the exemplary embodiment of the data transmitted over the different communication channels. The sequence of the data transmission steps is to be understood from top to bottom. First of all, for example, in accordance with the first variant, the reference value R1 and a checksum H1 for the data of the digital twin are transmitted as a reference dataset D1. The checksum H1 represents, for example, the hash value of the data of the digital twin. Thus, the data of the digital twin D2 of the workpiece WP, which contain a production plan or configuration parameters or the like, are not stored on the workpiece WP in a directly accessible way, but only in a form protected by a checksum.

The production unit Pa, which is intended to further process the workpiece WP, for example on the basis of the data of the digital twin D2, uses the reference value R1 to request the data of the digital twin D2, which are stored there on a memory, for example, from a central control unit or a cloud service, over a second communication channel Ch2.

The data of the digital twin D2 are provided to the production unit and this forms a second checksum H2 on the basis of the digital data D2. By using the same function for the checksum calculation as for the calculation of the first checksum H1, an identical value for the checksum calculation should thus be determined, so that H1=H2 is obtained. A consistency then exists between the reference data D1 and the data of the digital twin D2 and an authenticity of the data received via the IT communication network can be assumed. If a different checksum is obtained, then it is safe to assume a modification of the data of the digital twin D2 or a modification of the first checksum H1 or a faulty reference R1. In any case, the integrity of the data of the digital twin cannot be straightforwardly assumed.

Depending on the probability of vulnerabilities, error sources or manipulation attacks on the production line can now be sought. In particular, attacks are advantageously detected, which bring about a manipulation of the data of the digital twin D2. Similarly, a replacement of the workpiece WP or a manipulation of the workpiece WP is detected if the unique reference no longer matches the digital twin or the checksum H1 for securing the digital data of the twin D2 has been replaced or altered.

Figure 3:
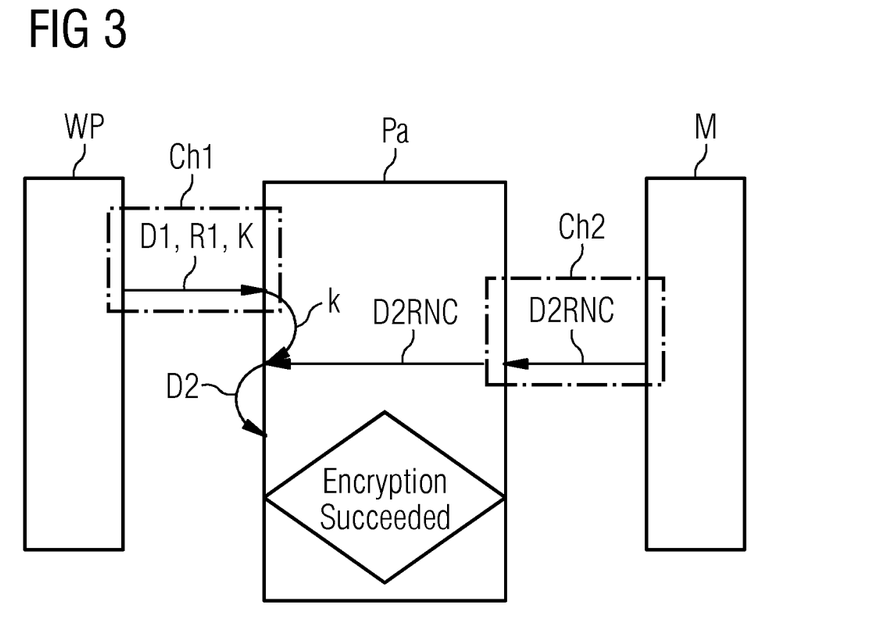
FIG. 3 a schematic representation of the communication steps according to a second variant of the exemplary embodiment.

According to a second variant, the workpiece WP transmits a reference value R1 and cryptographical key material K with the reference dataset D1. This variant is illustrated in FIG. 3. In particular, a key, for example a symmetric key, is transmitted directly. The production unit Pa in accordance with this variant receives data from the digital twin D2 in encrypted form D2ENC. This takes place via the second communication channel Ch2. Thus, in accordance with this variant, data of the digital twin D2 are transmitted in unencrypted form on one of the communication channels of the production plant at any time. In particular, by the reference value, the associated encrypted dataset D2ENC is requested. Alternatively, in particular the datasets of potential production objects, i.e., their digital twin-data, are already available in encrypted form on the production unit Pa and by the reference value, the subsequent consistency examination is performed.

A decryption algorithm is now applied by the production unit Pa or on a processor located thereon, in order to obtain the data of the digital twin D2 in unencrypted form from the decrypted data D2ENC of the digital twin by application of the cryptographic key K. If the decryption is successful, which can be tested, for example, by the reference value R1, further processing of the decrypted data of the digital twin D2 can take place. If this is not the case, for example, an alarm message is issued by the production unit Pa, to indicate a manipulation of the encrypted data D2ENC of the digital twin stored on the memory M or a manipulation of the workpiece WP.

Figure 4:
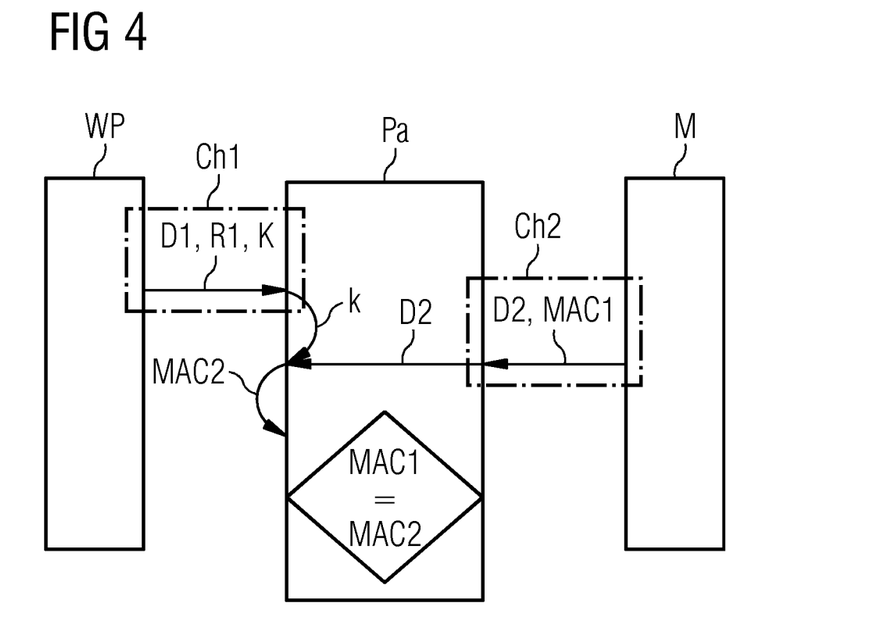
FIG. 4 a schematic representation of the communication steps according to a third variant of the exemplary embodiment.

FIG. 4 shows an alternative to the variant in FIG. 3, in which a Message Authentication Code MAC2 is transmitted to the production unit Pa over the second communication channel Ch2. This involves a checksum over the data of the digital twin D2 formed by means of a cryptographic key. By means of the cryptographic key K received over the first communication channel Ch1, a second Message Authentication Code MAC2 is formed and this is compared with the first Message Authentication Code MAC1. If these match, or match except for transmission errors, a consistency then exists between the reference data, including the key material, and the data of the digital twin, protected using MAC. From this it can be concluded that the reference value R1 transmitted over the first communication channel Ch1 and the cryptographic key K have been transmitted by the correct workpiece WP matching the digital twin, and have not been tampered with. In addition, it can thus be ensured that the data of the digital twin D2, which are stored, for example, on a cloud server in unencrypted form, have not been altered since the calculation of the Message Authentication Code MAC1. Therefore, the calculation should be performed in an earlier, secure phase. Alternatively, the calculation can be performed by appropriately authorized entities at run time.

Figure 5:
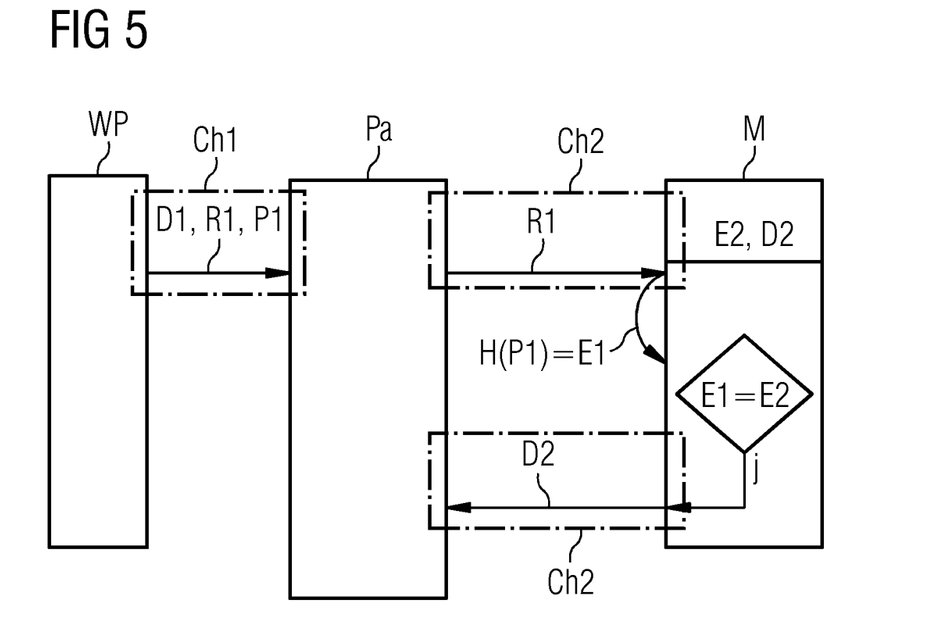
FIG. 5 a schematic representation of the communication steps according to a fourth variant of the exemplary embodiment.

In the case of a fourth variant, which is illustrated in FIG. 5, in addition to the reference value R1 an input value P1, or a so-called pre-image, is transmitted over the first communication channel. A cryptographic checksum, for example, a hash function, over the input value P1 produces the result E1. The input value P1 is transmitted over the second communication channel Ch2 in the communication network of the production plant, in particular to a central control unit with processor. This calculates the result E1 of applying a hash function to the input value P1. The production unit Pa must be able to present the correct input value P1 to an examination unit. Due to the one-way property of the hash function, this is only possible if the input value P1 of the production plant has been transmitted over the first communication channel. The correct input value P1, on the other hand, is not available over the second communication channel. In particular, within the communication network only one reference result E2 is present, with which E1 must match in order that the data of the digital twin D2 are also transmitted to the production unit Pa over the second communication channel.

Although the invention has been illustrated and described in greater detail by means of the exemplary embodiments, the invention is not restricted by the examples disclosed and other variations can be derived therefrom by the person skilled in the art without departing from the scope of protection of the invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for examining a consistency between reference data of a production object and data of a digital twin of the production object, comprising:
   transmitting the reference data between the production object and a production unit within a manufacturing plant over a first communication channel;
   transmitting the data of the digital twin between the production unit and a communication network of the manufacturing plant over a second communication channel,
   wherein an initial transmission over the first communication channel is linked to a physical proximity of the production object to a certain spatial environment within the manufacturing plant and a second transmission over the second communication channel is linked to an access to a communication network of the manufacturing plant, and wherein the first communication channel is independent of the second communication channel;

transmitting, in addition to a reference value, a first checksum over the data of the digital twin is also transmitted as reference data;
forming a second checksum over the data of the digital twin transmitted over the second communication channel;
comparing the second checksum with the first checksum; and
examining the first checksum and second checksum for consistency.

2. The method as claimed in claim 1, wherein the first communication channel is based on a physical proximity and is oriented, toward an optical communication procedure or for near-field communication procedures.

3. The method as claimed in claim 1, wherein the second communication channel is based on a communication infrastructure wherein the communication infrastructure is a Profibus or Industrial Ethernet structure.

4. The method as claimed in claim 1,
wherein as reference data, in addition to a reference value a symmetric key or information on how to generate a symmetric key is also transmitted, and wherein the data of the digital twin are stored in a form that is encrypted with a symmetric key and can be decrypted with the symmetric key.

5. The method as claimed in claim 1, wherein as reference data, in addition to a reference value, a symmetric key or information on how to generate a symmetric key is also transmitted and wherein, in addition to the data of the digital twin a first message authentication code for the data of the digital twin is additionally transmitted, and wherein a second message authentication code for the data of the digital twin transmitted over the second communication channel is formed by the symmetric key and the first message authentication code is compared with the second message authentication code and examined for consistency.

6. The method as claimed in claim 4, wherein the information is configured as an input value, suitable for generating the symmetric key using a key derivation function.

7. The method as claimed in claim 4, wherein a production-object-specific key or production-object-specific information are provided by incorporating production-object-specific characteristics into a key derivation function, wherein the production-object-specific characteristics are generated in particular by the reference value or by a physically unclonable function.

8. The method as claimed in claim 1, wherein in addition to a reference value, an input value of a one-way function is also transmitted as reference data, and wherein the data of the digital twin are transmitted over the second communication channel if a resulting value of the one-way function over the input value agrees with a stored resulting value.

9. A computer program product, comprising a computer readable hardware storage device having computer readable program code stored therein, said program code executable by a processor of a computer system to implement a method with a computer program, which carries out the method as claimed in claim 1, when the computer program is executed on a program-controlled device.

10. A production unit having
a processor;
a first interface to a production object, wherein reference data of the production object can be received over the first interface by the production unit from the production object, wherein an initial transmission of the reference data is linked to a physical proximity between the production unit and production object, and
a second interface to a communication network of a manufacturing plant, wherein data from a digital twin of the production object are received by the production unit from the communication network over the second interface, wherein a second transmission of the data from the digital twin is linked to an access to the communication network, wherein the processor is configured to determine a consistency between reference data of the production object and the data of the digital twin of the production object, and wherein the first interface is independent from the second interface,
wherein in addition to a reference value, a first checksum over the data of the digital twin is also transmitted as reference data, and wherein a second checksum is formed over the data of the digital twin transmitted over a second communication channel, and the second checksum is compared with the first checksum and examined for consistency.

11. The production unit as claimed in claim 10, wherein a processor is provided as an examination unit and the processor is integrated into the production unit or is provided by a cloud service, or is integrated into a control unit of the manufacturing plant, together with a memory unit for storing the data of the digital twin.

12. An arrangement comprising a production object, production unit, memory unit and processor, having a first communication channel between production object and production unit based on a physical proximity between production unit and production object for the transmission of reference data of the production object and having a second communication channel of a communication network between production unit and memory unit for the transmission of data from a digital twin of the production object, wherein the processor is suitable for examining a consistency between the reference data and the data of the digital twin,
wherein in addition to a reference value, a first checksum over the data of the digital twin is also transmitted as reference data, and wherein a second checksum is formed over the data of the digital twin transmitted over the second communication channel, and the second checksum is compared with the first checksum and examined for consistency.

13. The arrangement as claimed in claim 12, wherein the processor is integrated into the production unit or is provided by a cloud service or is integrated into a control unit of a manufacturing plant, jointly with the memory unit.

14. A method for examining a consistency between reference data of a production object and data of a digital twin of the production object, comprising:
transmitting the reference data over a first communication channel and the data of the digital twin over a second communication channel, wherein an initial transmission over the first communication channel is linked to a physical proximity of the production object to a certain spatial environment within a manufacturing plant and a second transmission over the second communication channel is linked to an access to a communication network of the manufacturing plant,
transmitting, in addition to a reference value, a first checksum over the data of the digital twin is also transmitted as reference data;
forming a second checksum over the data of the digital twin transmitted over the second communication channel;
comparing the second checksum with the first checksum; and examining the first checksum and second checksum for consistency, wherein as reference data, in addition to a reference value, a symmetric key or information on how to generate a symmetric key is also transmitted and wherein, in addition to the data of the digital twin a first message authentication code for the data of the digital twin is additionally transmitted, and wherein a second message authentication code for the data of the digital twin transmitted over the second communication channel is formed by the symmetric key and the first message authentication code is compared with the second message authentication code and examined for consistency.

* * * * *